United States Patent
Hsu et al.

(10) Patent No.: US 11,240,029 B2
(45) Date of Patent: Feb. 1, 2022

(54) METHOD OF REGISTRATION AND ACCESS CONTROL OF IDENTITY FOR THIRD-PARTY CERTIFICATION

(71) Applicant: Quanhong Technology Co.,Ltd., Kaohsiung (TW)

(72) Inventors: Nai-ho Hsu, Kinmen County (TW); Chi-Kuang Lee, Kaohsiung (TW); Yu-Jen Chen, Kaohsiung (TW)

(73) Assignee: Quanhong Technology Co., Ltd., Kaohsiung (TW)

( * ) Notice: Subject to any disclaimer, the term of this patent is extended or adjusted under 35 U.S.C. 154(b) by 0 days.

(21) Appl. No.: 16/890,127

(22) Filed: Jun. 2, 2020

(65) Prior Publication Data
US 2020/0382300 A1    Dec. 3, 2020

(30) Foreign Application Priority Data

Jun. 3, 2019    (TW) .................. 108119234

(51) Int. Cl.
| | |
|---|---|
| H04L 9/32 | (2006.01) |
| G06F 21/34 | (2013.01) |
| H04L 9/06 | (2006.01) |
| G06K 9/00 | (2006.01) |
| G06F 21/45 | (2013.01) |
| G06F 21/35 | (2013.01) |
| G06F 21/60 | (2013.01) |
| G06F 21/62 | (2013.01) |
| G06Q 20/02 | (2012.01) |

(Continued)

(52) U.S. Cl.
CPC .............. *H04L 9/321* (2013.01); *G06F 21/32* (2013.01); *G06F 21/34* (2013.01); *H04L 9/0618* (2013.01); *H04L 9/3226* (2013.01); *G06F 2221/2115* (2013.01); *G06F 2221/2117* (2013.01); *G06K 9/00442* (2013.01); *H04L 2209/38* (2013.01)

(58) Field of Classification Search
CPC ..... H04L 9/321; H04L 9/0618; H04L 9/3226; H04L 2209/38; H04L 9/0861; G06F 21/32; G06F 21/34; G06F 2221/2115; G06F 2221/2117; G06F 21/45; G06F 21/35; G06F 21/604; G06F 21/6272; G06K 9/00442; G06K 9/20; G06Q 20/02; G06Q 20/38215
See application file for complete search history.

(56) References Cited

U.S. PATENT DOCUMENTS 10,110,385 B1 * 10/2018 Rush .................. H04L 9/3297
10,270,771 B1 *  4/2019 Tamanini ............ G06F 16/9566
(Continued)

*Primary Examiner* — Darren B Schwartz
(74) *Attorney, Agent, or Firm* — Amin, Turocy & Watson, LLP

(57) ABSTRACT

A method of registration and access control of identity for third-party certification is provided. The method has steps of registration and steps of access control. The steps of registration have: controlling a user-end computer apparatus to retrieve an identity image of an identity document of a user; executing processes on the identity image for obtaining identity data; retrieving embedded identity data from the identity document; and configuring and registering the identity data if the data are matched with each other. The steps of access control have: controlling the user-end computer apparatus to verify user's identity upon reception of request of identity access, and generating and returning return identity data to a request-end computer apparatus.

15 Claims, 12 Drawing Sheets

(51) Int. Cl.
  *G06Q 20/38*   (2012.01)
  *G06K 9/20*    (2006.01)
  *H04L 9/08*    (2006.01)
  *G06F 21/32*   (2013.01)

(56) References Cited

U.S. PATENT DOCUMENTS

| | | | |
|---|---|---|---|
| 10,325,084 B1* | 6/2019 | Larimer | G06F 21/44 |
| 10,452,897 B1* | 10/2019 | Benkreira | G06K 9/344 |
| 2002/0129251 A1* | 9/2002 | Itakura | G07F 7/086 |
| | | | 713/176 |
| 2004/0181671 A1* | 9/2004 | Brundage | H04L 9/3231 |
| | | | 713/176 |
| 2007/0260886 A1* | 11/2007 | Dufour | G06K 9/00885 |
| | | | 713/186 |
| 2012/0297190 A1* | 11/2012 | Shen | H04L 63/0815 |
| | | | 713/168 |
| 2013/0305059 A1* | 11/2013 | Gormley | H04L 9/0866 |
| | | | 713/189 |
| 2014/0294258 A1* | 10/2014 | King | G06K 9/00221 |
| | | | 382/118 |
| 2016/0239657 A1* | 8/2016 | Loughlin-McHugh | |
| | | | H04L 63/0807 |
| 2018/0165781 A1* | 6/2018 | Rodriguez | H04L 9/3234 |
| 2018/0227130 A1* | 8/2018 | Ebrahimi | H04L 9/3236 |
| 2018/0248699 A1* | 8/2018 | Andrade | H04L 9/0897 |
| 2019/0179954 A1* | 6/2019 | Mardikar | H04L 9/3213 |
| 2019/0182042 A1* | 6/2019 | Ebrahimi | H04L 9/3247 |
| 2020/0127832 A1* | 4/2020 | Ebrahimi | H04L 9/3239 |
| 2020/0195436 A1* | 6/2020 | Khan | H04L 9/3213 |
| 2020/0228340 A1* | 7/2020 | Blackhurst | H04L 63/0861 |
| 2020/0342459 A1* | 10/2020 | Boyle | G06Q 20/3829 |
| 2020/0410074 A1* | 12/2020 | Dang | G06K 9/00456 |

\* cited by examiner

METHOD OF REGISTRATION AND ACCESS CONTROL OF IDENTITY FOR THIRD-PARTY CERTIFICATION

BACKGROUND OF THE INVENTION

1. Technical Field

The present invention relates to identity verification, and more particularly to a method of registration and access control of identity for third-party certification.

2. Description of Related Art

Currently, a common practice of identity registration, such as in the case of member registration used in on-line shops or other on-line services, relies solely on identity data provided by users. This practice, however, provides no approaches to authenticating these identity data and thus fails to prevent registration of fake accounts.

Another existing on-line user registration process requires a user to provide the image of his/her identity document, for checking correctness of the identity data input by the user. Due to absence of mechanism of checking whether the image from the user is veracious or not and whether the identity document belong to the user or not, this known registration process still leaves the issue of fake accounts unaddressed.

In addition, the existing methods of identity access control prevent websites from sharing member data therebetween, and thus if a user wants to use on-line services from different websites, he/she will unavoidably experience great inconvenience as he/she repeats registration and identity-certification processes and remembers all usernames and passwords for different websites.

Hence, there is a need for a novel approach that effectively addresses all the aforementioned issues of the existing practice of identity registration and access control.

SUMMARY OF THE INVENTION

The primary objective of the present invention is to provide a method of registration and access control of identity for third-party certification, which is designed to check whether an identity document provided by a user for the purpose of registration duly belongs to the user during a registration process, and to provide websites with veracious identity data of users by means of third-party certification during a data access control process.

To achieve the foregoing objective, the present invention provide a method of registration and access control of identity for third-party certification, comprising steps of: in a registration mode, controlling a user-end computer apparatus to retrieve an identity image of an identity document of a user, wherein the identity image is obtained by photographing an identity data page in the identity document using an image-capturing module; executing an optical character recognition process and an identity analysis process so as to obtain analyzed identity data; retrieving embedded identity data from the identity document using a communication module of the user-end computer apparatus; if the analyzed identity data and the embedded identity data are at least partially matched with each other, according to at least one of the analyzed identity data and the embedded identity data, configuring and registering the identity data of the user; in an access control mode, controlling the user-end computer apparatus to execute identity verification for the user upon reception of an identity-access request from a request-end computer apparatus; and when the user passes the identity verification, according to the identity data of the user and the identity-access request, generating and returning return identity data to the request-end computer apparatus.

The present invention is effective in ensuring veracity of user identify for registration user, preventing fake accounts, simplifying certification, and further securing identity access control.

DETAILED DESCRIPTION OF THE INVENTION

For further illustrating the means and functions by which the present invention achieves the certain objectives, the following description, in conjunction with the accompanying drawings and preferred embodiments, is set forth as below to illustrate the implement, structure, features and effects of the subject matter of the present invention.

Figure 1:
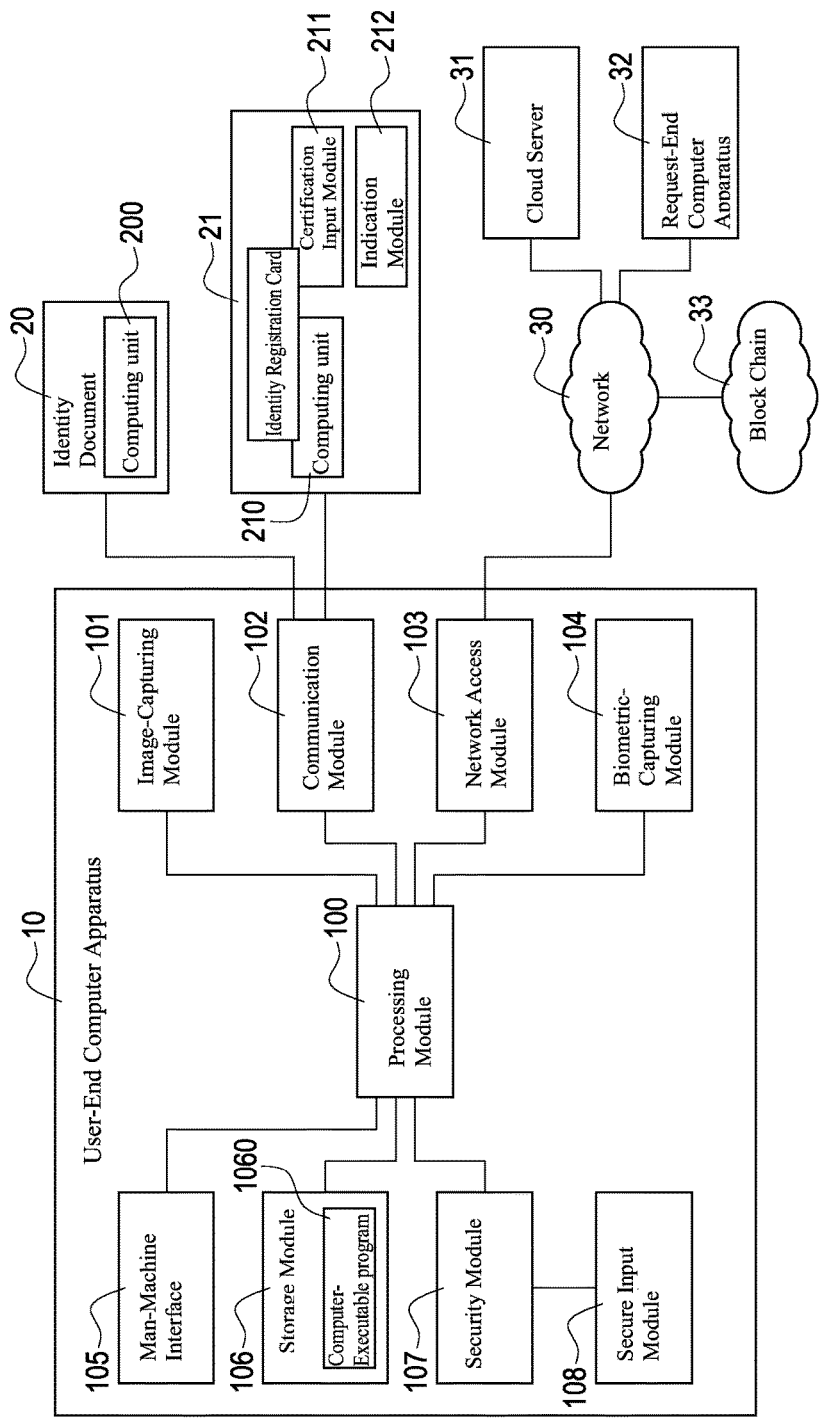
FIG. 1 is a structural diagram of an identity access control system according to one embodiment of the present invention.

Referring to FIG. 1, which is a structural diagram of an identity access control system according to one embodiment of the present invention, the identity access control system 1 is configured to execute a method of registration and access control of identity for third-party certification, as described below. The identity access control system 1 is made to accept user registration and verify user's identity documents in order to ensure veracity of the received identity data. The identity access control system 1 also enables third-party certification, in which veracious identity data of a user can be provided to a designated request-end computer apparatus 32 (such as a registration server of a website), thereby achieving fast identity verification. This contributes to the user's convenient use of services provided by the request-end computer apparatus 32 without asking the user to conduct a registration process manually.

It is worthy to be noted that, for the purpose of the present invention, an identity document 20 held by a user is an e-ID equipped with a computing unit 200 (such as a chip-embedded passport or a chip-embedded ID card), instead of a paper ID. The computing unit 200 is loaded with electronic identity data of the user (such as his/her name, data of birth, ID number and/or nationality, hereinafter referred to as the user's embedded identity data).

In addition, the embedded identity data stored in the computing unit 200 may include a part or the entire of the printed contents of the identity document 20 (i.e. what is recorded on the embedded identity data page of the identity document).

In one embodiment, the computing unit 200 further contains contents of the identity document 20 that are not presented in a printed manner (e.g., user biometrics such as fingerprint features or iris features, or the user's personal data, such as his/her house address or telephone number, among others).

The identity access control system 1 comprises a user-end computer apparatus 10. The user-end computer apparatus 10 (such as a smartphone, a wearable device, a tablet, a laptop computer and so on) may belong to the user and may have an image-capturing module 101, a communication module 102, a network access module 103 and a processing module 100 that is electrically connected to the above-indicated modules.

The image-capturing module 101 (such as a camera) is configured to photograph external images. The communication module 102 is configured to establish near-field (including contact) communication with an external device (such as the computing unit 200 of the identity document 20). The network access module 103 (such as a mobile network module, a Wi-Fi module or an Ethernet module) is configured to connect a network 30 (such as the Internet) for data communication. The processing module 100 serves to control the user-end computer apparatus 10.

In one embodiment, the communication module 102 may be a wireless near-field communication module, such as an NFC module, a Bluetooth module, or an ultrasonic module. Alternatively, the communication module 102 may be a contact communication module, such as a contact IC card reader or smartcard reading/writing module. Moreover, the identity document 20 may include a communication interface that is electrically connected to the computing unit 200. The communication interface uses a communication technology compatible with the communication module 102 so as to perform data communication with the communication module 102.

By using near-field communication to retrieve the embedded identity data stored in the computing unit 200 of the identity document 20, the present invention can make certain that the identity document 20 is truly held by the user but not coming from unauthorized use.

In one embodiment, the user-end computer apparatus 10 further comprises a man-machine interface 105 that is electrically connected to the processing module 100 (e.g. a key module, an input module and/or display module such as a touch control module, or an output module such as an indication lamp). The man-machine interface 105 serves to receive the user's operation and provide the user with information.

In one embodiment, the user-end computer apparatus 10 further comprises a storage module 106 that is electrically connected to the processing module 100. The storage module 106 serves to store data.

In one embodiment, the storage module 106 may include a non-transitory storage medium. The non-transitory storage medium keeps a computer-executable program 1060 (such as an application). The computer-executable program 1060 includes a computer-executable code. The processing module 100 can further realize the methods as described in various embodiments of the present invention by executing the computer-executable code.

The disclosed method of registration and access control of identity for third-party certification mainly comprises a registration process (also referred to as a registration mode hereinafter) and an access control process (also referred to as a registration mode hereinafter). The registration process and the access control process will be explained bellow.

Figure 2:
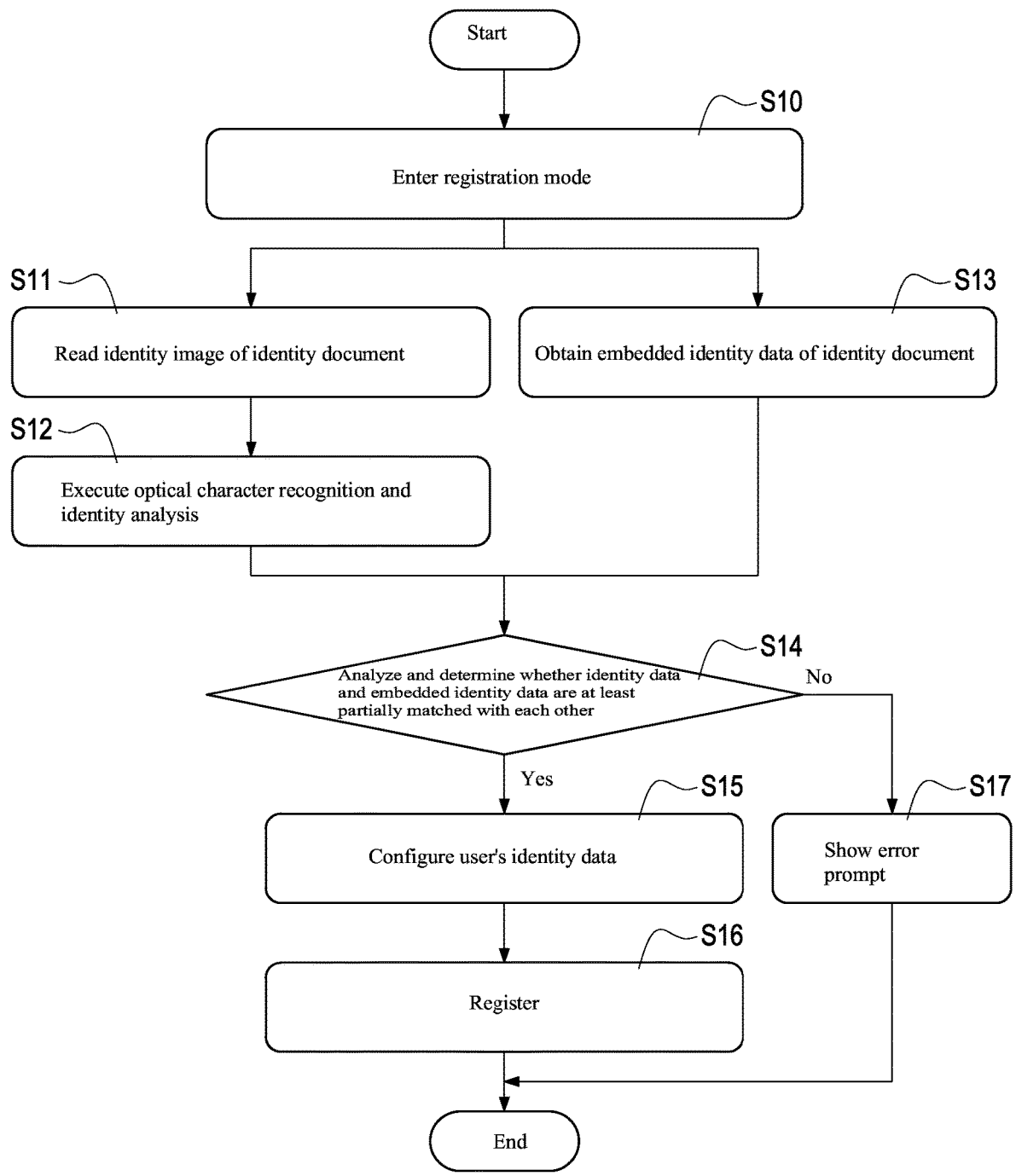
FIG. 2 is a flowchart of identity registration according to a first embodiment of the present invention.
Figure 7:
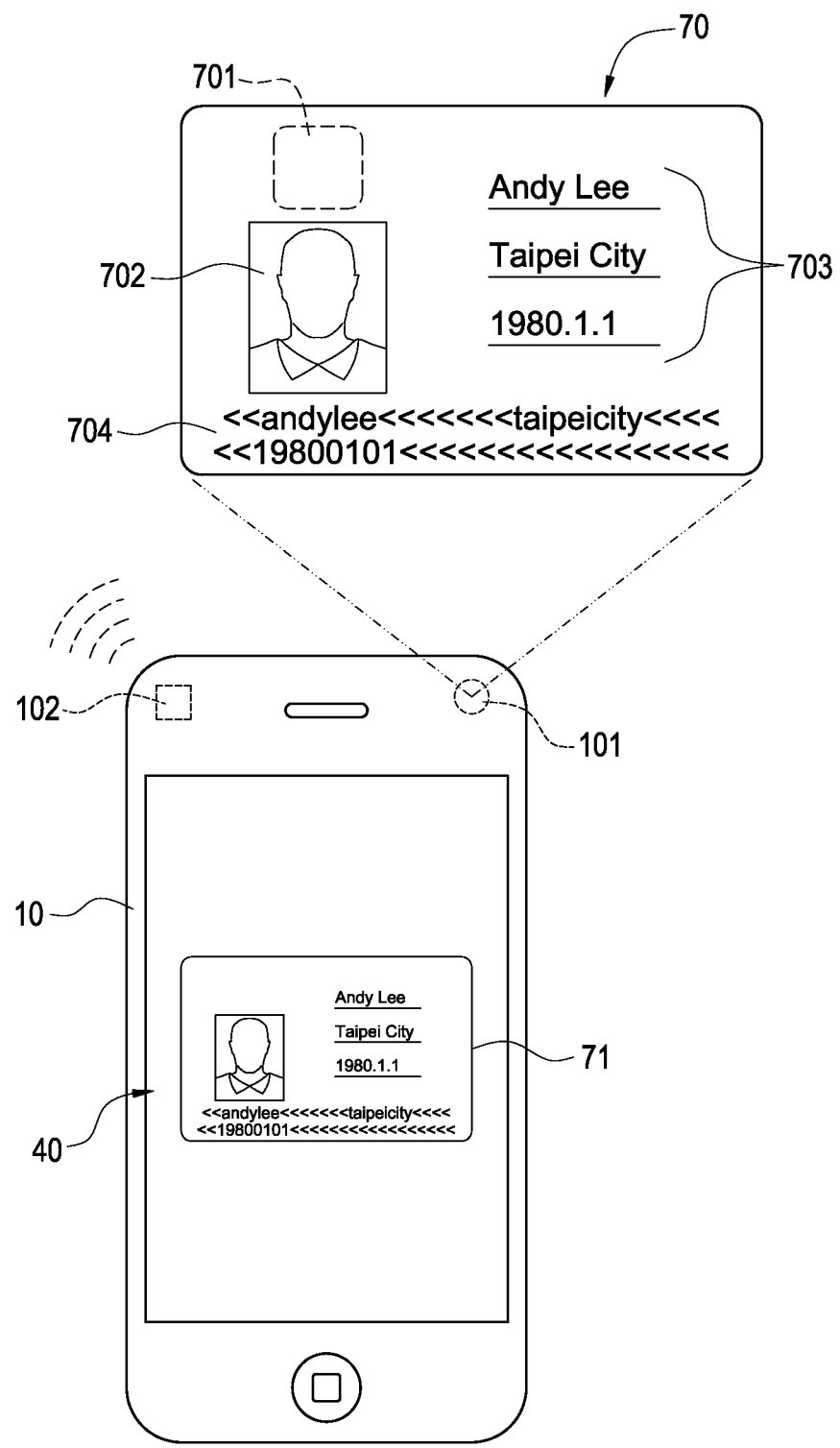
FIG. 7 is a schematic illustration of identity registration according to one embodiment of the present invention.

Please refer to FIG. 1, FIG. 2 and FIG. 7. FIG. 2 is a flowchart of identity registration according to a first embodiment of the present invention. FIG. 7 is a schematic illustration of identity registration according to one embodiment of the present invention. In the depicted embodiment, the registration process comprises the following steps.

In Step S10, the user-end computer apparatus 10 enters the registration mode in response to the user's operation (or when a predetermined condition is satisfied), so as to guide the user to perform identity registration.

In Step S11, the processing module 100 retrieves an identity image of the user's identity document.

In one embodiment, as shown in FIG. 7, the identity document 70 belonging to the user is equipped with a computing unit 701, which may be identical or similar to the computing unit 200 as described previously and therefore is not repeatedly explained herein. The identity document 70 also has an identity data page in a printed form, which presents the user's photograph 702 and field data 703 of the user's identity data. In the example shown in FIG. 7, the user's name is Andy Lee, born on Jan. 1, 1980, and the document was issued in Taipei City. The user can operate the user-end computer apparatus 10 and use the image-capturing module 101 to photograph the identity data page of the identity document 70, so as to obtain an identity image 71. Moreover, the user-end computer apparatus 10 may display the photographed identity image 71 through the man-machine interface 105 (for example, a display module 40 in FIG. 7) in a real-time manner, for the user to check the image quality.

In one embodiment, the identity data page of the identity document 70 may further provide a machine-readable code 704. The machine-readable code 704, which may be generated by encoding the encrypted field data 703, serves as an anti-counterfeiting mechanism for authenticating veracity of the field data 703 through a certification process that will be detailed below.

In Step S12, the processing module 100 execute optical character recognition on the obtained identity image so as to recognize characters in the identity image 71 and their arrangement, and then executes an identity analysis process on the recognized characters and their arrangement, thereby obtaining analyzed identity data. To be specific, the analyzed identity data contains the field data 703 and/or the machine-readable code 704.

In Step S13, the processing module 100 retrieves the embedded identity data from the identity document through the communication module 102.

In one embodiment, as shown in FIG. 7, the communication module 102 may be an NFC module (or an RFID module). The identity document 70 may comprise an NFC interface electrically connected to the computing unit 701. The user may put the identity document 70 close to the communication module 102, which has been enabled, for near-field communication. Thereby, the processing module 100 may request for embedded identity data from the computing unit 701 through the communication module 102 and the NFC interface while powering the computing unit 701 and the NFC interface). The computing unit 701 can then return the embedded identity data to the user-end computer apparatus 10.

In one embodiment, the communication module 102 may be a contact IC card reader. When the identity document 20 is inserted to the communication module 102 by the user, the communication module 102 contacts the computing unit 200. Thereby, the user-end computer apparatus 10 can retrieve the embedded identity data from the computing unit 200.

In Step S14, the processing module 100 compares the analyzed identity data obtained using optical character recognition and the embedded identity data obtained using electronic communication to see whether they are matched with each other (i.e. whether their contents are partially or entirely consistent with each other).

In one embodiment, the processing module 100 only determines that the analyzed identity data and the embedded identity data are matched with each other when the two are fully identical. However, the present invention is not limited thereto.

In one embodiment, as long as the analyzed identity data and the embedded identity data are consistent with each other to some extent (meaning that they have some common data), the processing module 100 determines that they are matched with each other.

In one embodiment, as shown in FIG. 7, the processing module 100 compares the machine-readable code 704 in the analyzed identity data with the machine-readable code in the embedded identity data to see whether they are matched with each other.

In one embodiment, the processing module 100 decodes the machine-readable code 704 in the analyzed identity data into field data, and compares the variety of analyzed field data obtained through decoding with the variety of embedded field data recorded in the embedded identity data to see whether they are matched with each other.

If the processing module 100 performs comparison and finds that the compares analyzed identity data and the embedded identity data are matched with each other, it executes Step S15. Otherwise, the processing module 100 executes Step S17 instead.

In Step S15, the processing module 100 configures the user's identity data according to the analyzed identity data and the embedded identity data.

In particular, the processing module 100 directly uses the analyzed identity data as the user's identity data, or directly uses the embedded identity data as the user's identity data. Since errors can occur during optical character recognition and identity analysis, by advantageously using the embedded identity data as the user's identity data, the present invention eliminates the risk of setting defective identity data generated by the processing- or analysis-related errors in the system.

In Step S16, the processing module 100 performs identity registration according to the user's identity data a set in the previous step, by, for example, uploading the user's identity data to a network 30 or storing the data in the storage module 106, without limitation.

In Step S14, if the processing module 100 finds that the analyzed identity data and the embedded identity data are not matched with each other after comparison, it executes Step S17, where the processing module 100 shows an error prompt (such as acoustic warning or an error message) through the man-machine interface 105 to inform the user of the failed registration due to inconsistence between the identity information page of the identity document 20 and the data in the computing unit 200. Such inconsistence may stem from a fake identity document 20 or faulty analyzed identity data caused by a defective optical character recognition process.

The present invention use double certification of the identity document provided by the user for registration to effectively ensure the identity asking for registration is authentic, thereby preventing malicious users using fake documents or providing fake identity data from successful registration.

Figure 3:
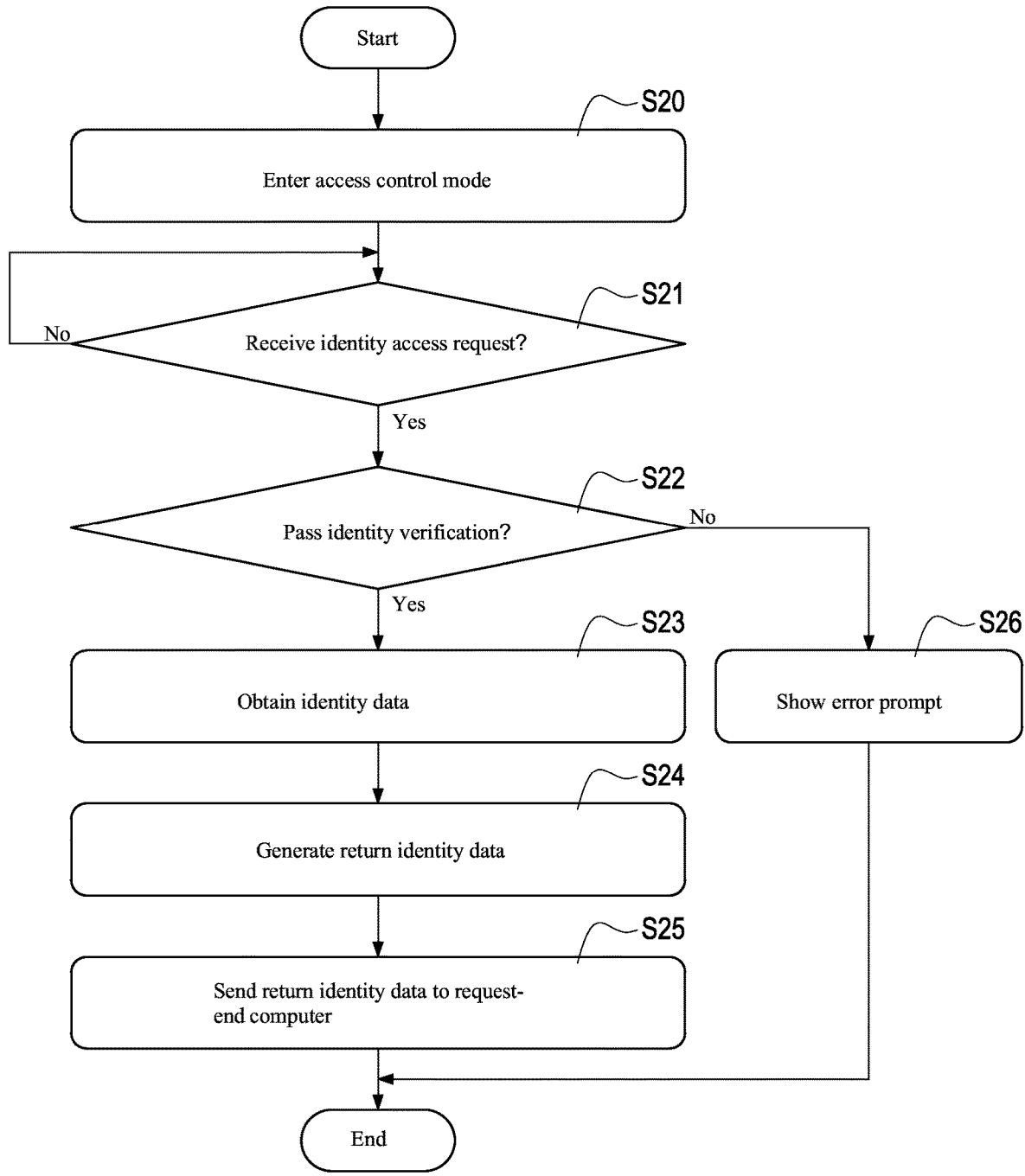
FIG. 3 is a flowchart of identity access control according to a second embodiment of the present invention.

Please refer to FIG. 1 and FIG. 3. FIG. 3 is a flowchart of identity access control according to a second embodiment of the present invention. In particular, after completing registration of his/her identity data, the user is allowed to use fast certification. The access control process as described for the present embodiment realizes fast certification through the following steps.

In Step S20, the processing module 100 of the user-end computer apparatus 10 enters the access control mode in response to the user's operation (or when a predetermined condition is satisfied), so as to guide the user to perform fast identity verification.

In Step S21, the processing module 100 determines whether an identity-access request is received from the request-end computer apparatus 32.

In particular, as shown in FIG. 1, the network access module 103 of the user-end computer apparatus 10 connects a request-end computer apparatus 32 (such as an on-line shop website or a server of a service provider's website) through the network 30. When the user wants to use the services and therefore has to pass identity verification (by logging in the website, for example), the request-end computer apparatus 32 may raise an identity-access request to the user-end computer apparatus 10 for the user's identity data, so as to validate the user's identity.

When receiving such an identity-access request from the request-end computer apparatus 32, the processing module 100 executes Step S22. Otherwise, the processing module 100 executes Step S21 again.

In Step S22, the processing module 100 performs identity verification on the user to verify whether the user is exactly the one who duly performed registration previously.

In one embodiment, the foregoing identity verification may be biometric identification (such as fingerprint recognition, iris recognition, vein recognition, etc.), face identification (by comparing the current user's face with the face image of the relevant registered user and determining whether they are matched with each other), password certification (by comparing and determining whether the string password or graphic password input by the current user is matched with the preset string password or graphic password), operational qualification (by comparing and determining whether the operational behavior of the current user is matched with the preset operational behavior, such as pressing designated keys) or security question certification (by asking the current a present question and determining whether his/her answer is correct).

In one embodiment, the identity verification may be realized using a software lock (such as a screen lock) of the user-end computer apparatus 10. For example, when the screen lock at the user-end computer apparatus 10 is released, it is determined that the current user passes identity verification.

If the processing module 100 determines that the current user passes identity verification, it executes Step S23. Otherwise, the processing module 100 executes step S26.

In Step S23, the processing module 100 retrieves the identity data of the previously registered user through identity verification.

In Step S24, the processing module 100 generates return identity data according to the user's identity data and identity-access request.

In one embodiment, the identity data includes a variety of field data (such as the user's photograph, name, date of birth, address, etc.). The processing module 100 selects a part of the field data according to the identity-access request, and uses the selected part of the field data to generate the return identity data. This minimizes disclosure of the field data and in turn better protects the user's identifying personal data.

In Step S25, the processing module 100 returns the generated return identity data to the request-end computer apparatus 32. Afterward, the request-end computer apparatus 32 performs certification according to the received return identity data, and authorizes the certified user to use the on-line service.

If the processing module 100 determines that the user fails in identity verification, it executes Step S26. The processing module 100 shows an error prompt through the man-machine interface 105 to indicate the current user's failure in identity verification because he/she is not the registered user. At this time, the processing module 100 does not generate or send the return identity data of the registered user to the request-end computer apparatus 32, thereby preventing unnecessary disclosure of the registered user's identity data.

Figure 8:
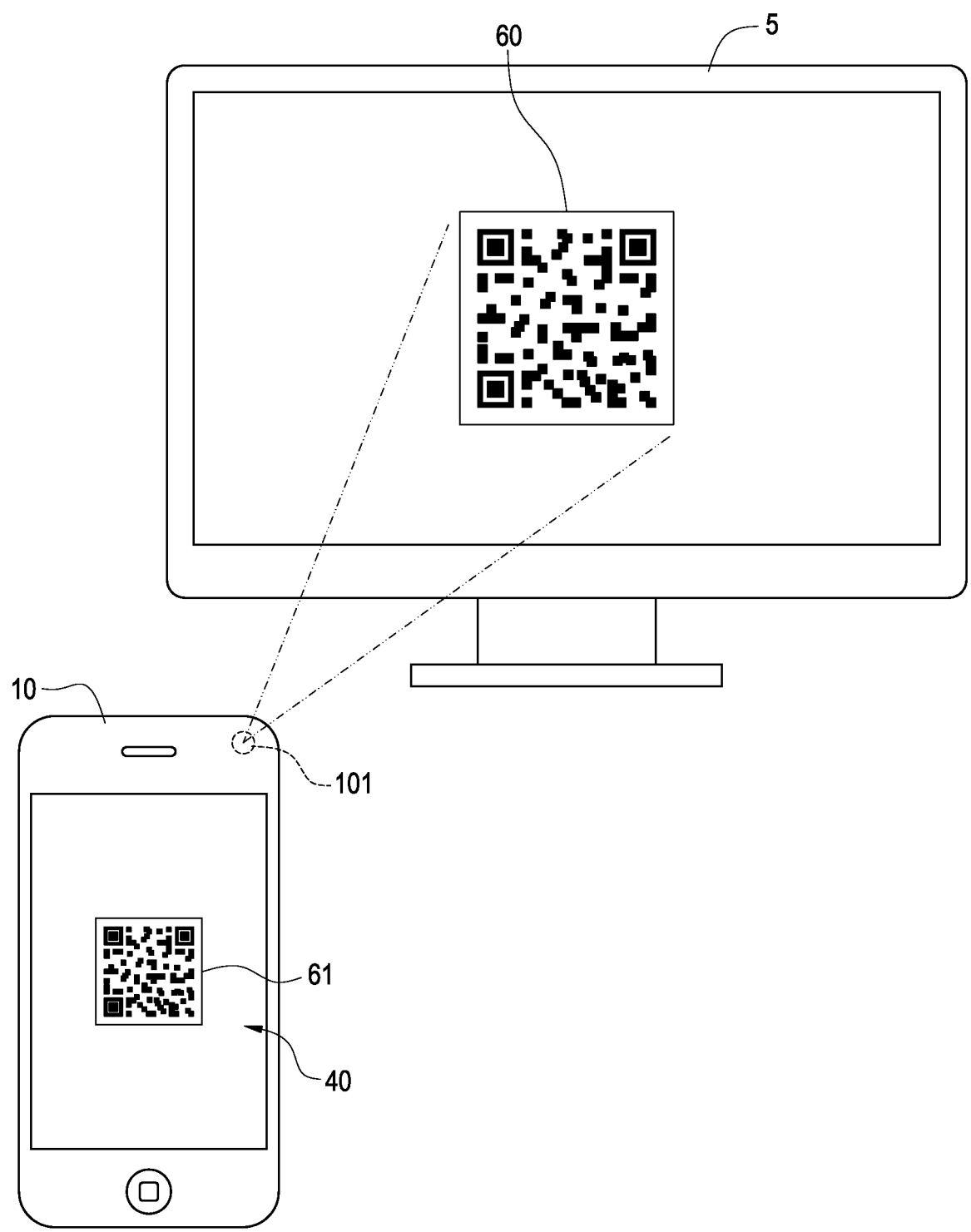
FIG. 8 is a first schematic operational illustration of identity access control according to one embodiment of the present invention.
Figure 9:
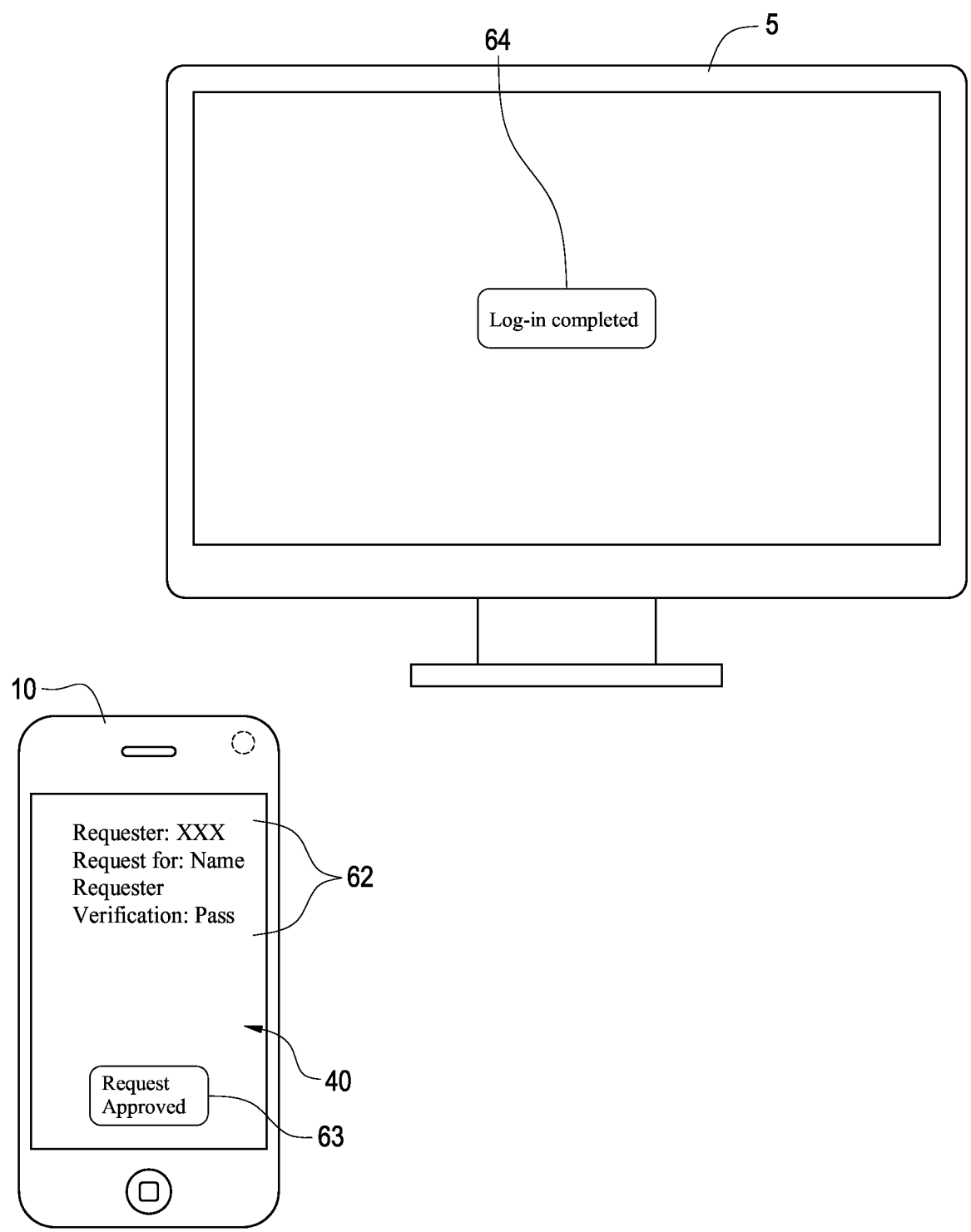
FIG. 9 is a second schematic operational illustration of identity access control according to one embodiment of the present invention.

Please refer to FIG. 8 and FIG. 9. FIG. 8 is a first schematic operational illustration of identity access control according to one embodiment of the present invention. FIG. 9 FIG. 9 FIG. 8 and FIG. 9 illustrate a mode of fast certification according to the present invention.

First, as shown in FIG. 8, when the user wants to use services of the request-end computer apparatus 32 through an external computer apparatus 5 (such as a desktop computer), identity verification is required. The request-end computer apparatus 32 may embed the identity-access request in a two-dimensional barcode 60 (or in another machine-readable format instead) and send the two-dimensional barcode 60 to the external computer apparatus 5 so that the two-dimensional barcode 60 is displayed at the display of the external computer apparatus 5.

Next, the user may operate the image-capturing module 101 of the user-end computer apparatus 10 to scan the two-dimensional barcode 60 thereby obtaining an input barcode image 61 and decode the input barcode image 61 to obtain the identity-access request.

Then, as shown in FIG. 9, the user-end computer apparatus 10 analyzes the identity-access request and displays the analyzed information 62 (such as the requester's name, the requester's field data, and whether the requester has passed certification) through the display module 40.

Furthermore, the user-end computer apparatus 10 is further provided with a confirmation key 63. After passing identity verification, the confirmation key 63 can be pressed to authorize identity access, which making the return identity data sent to the request-end computer apparatus 32.

At last, the request-end computer apparatus 32, after determining that the return identity data passes certification, shows certification result information 64 (such as in the form of a successful log-in message), and authorizes the external computer apparatus 5 to use the services. Thereby, the user can conveniently get access to the services without manually performing registration through the request-end computer apparatus 32.

The present invention improves identity access control by only providing the identity data after the user passes identity verification.

In addition, the present invention uses third-party certification to provide a website with authentic identity data of the user, thereby significantly simplifying the certification process, facilitating the user's convenient access of on-line services, and preventing successful registration of fake accounts.

Figure 4:
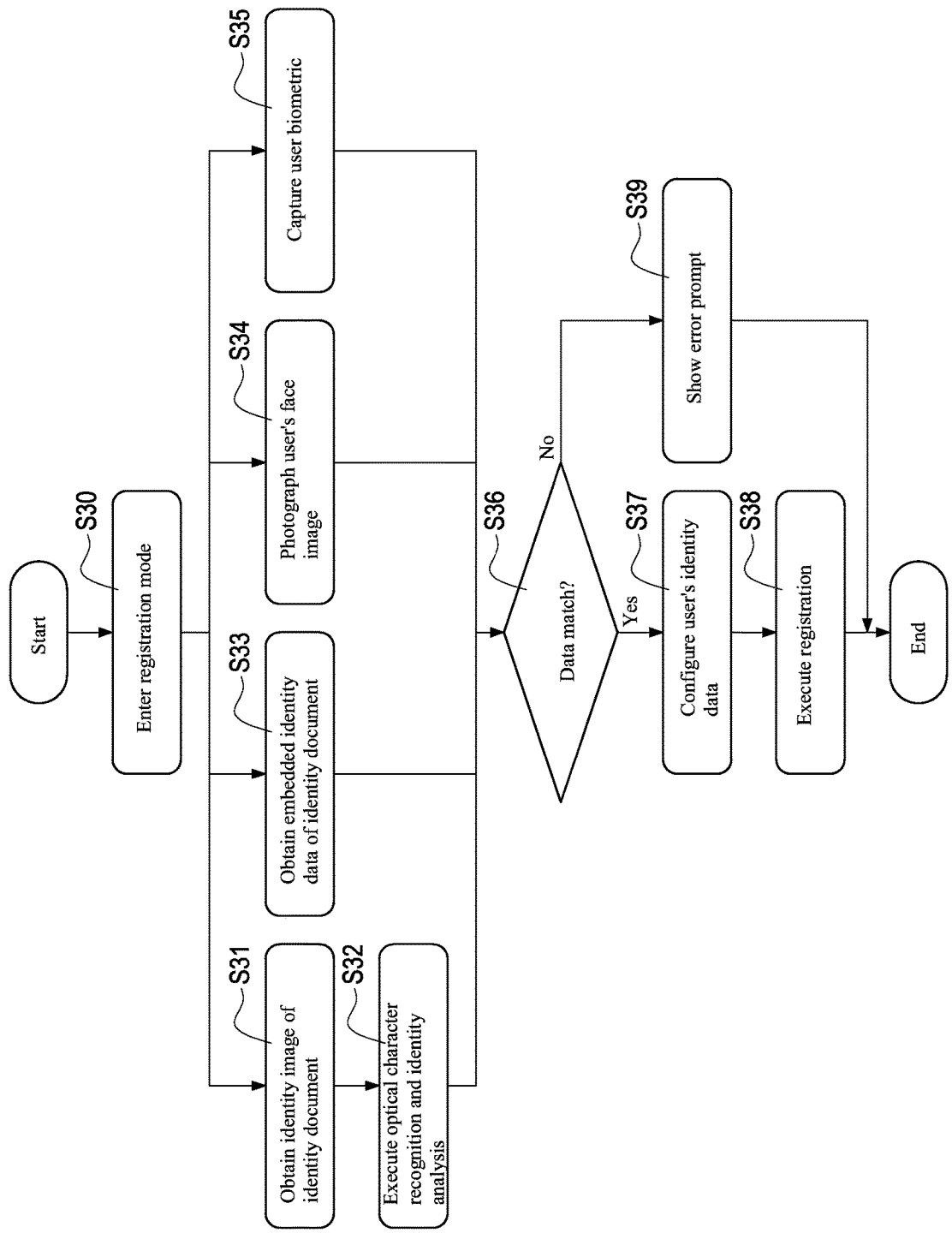
FIG. 4 is a flowchart of identity registration according to a third embodiment of the present invention.

Please refer to FIG. 1 and FIG. 4. FIG. 4 is a flowchart of identity registration according to a third embodiment of the present invention. The present embodiment provides an alternative approach to certification and registration conducted by a user himself/herself. The registration process of the present embodiment comprises the following steps.

In Step S30, the user-end computer apparatus 10 enters a registration mode.

In Step S31, the processing module 100 retrieves an identity image of the user's identity document through the image-capturing module 101.

In Step S32, the processing module 100 executes an optical character recognition process and an identity analysis process on the identity image for obtaining analyzed identity data.

In Step S33, the processing module 100 retrieve embedded identity data from the identity document through the communication module 102.

In one embodiment, the embedded identity data further comprises an embedded face image and/or an embedded biometric.

In Step S34, the processing module 100 photographs the user's face using the image-capturing module 101 so as to obtain the user's face image.

In Step S35, the processing module 100 captures the user's biometrics using a biometric-capturing module.

In particular, as shown in FIG. 1, the user-end computer apparatus 10 further comprises a biometric-capturing module 104 electrically connected to the processing module 100 (such as a fingerprint recognition module, an iris recognition module or a vein recognition module). The biometric-capturing module 104 is used to capture the user's biometrics (fingerprint feature, iris features or vein features, etc.).

In Step S36, the processing module 100 performs comparison and determines whether the embedded identity data is matched with the analyzed identity data and is relevant to the user (such as the user's face image being matched with the embedded face image in the embedded identity data, and/or the user's biometrics embedded face image the embedded biometrics in the embedded identity data).

If the processing module 100 determines that the data are matched with each other, it executes Step S37. Otherwise, the processing module 100 executes step S39.

In Step S37, the processing module 100 configures the user's identity data according to the embedded identity data.

In Step S38, the processing module 100 performs identity registration according to the configured user's identity data.

If the processing module 100 determines that the data are not matched, it executes Step S39. The processing module 100 shows an error prompt through the man-machine interface 105.

By combining face recognition and biometric recognition to realize two-factor certification, the present invention effectively improves certification reliability and efficiently determines whether the current user is a living being but not an electrical entity made for fake account registration).

Figure 5:
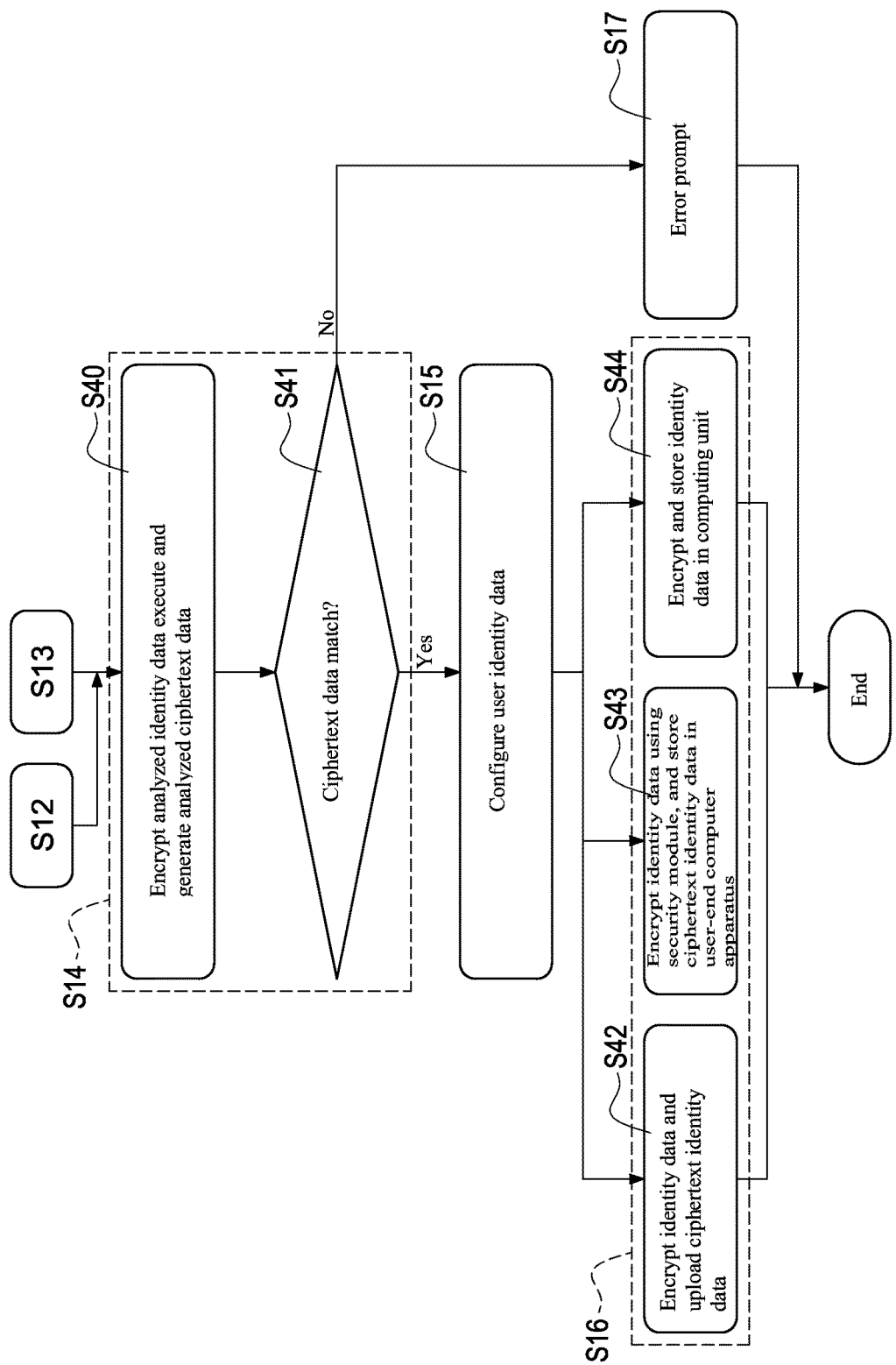
FIG. 5 is a partial flowchart of identity registration according to a fourth embodiment of the present invention.
Figure 10:
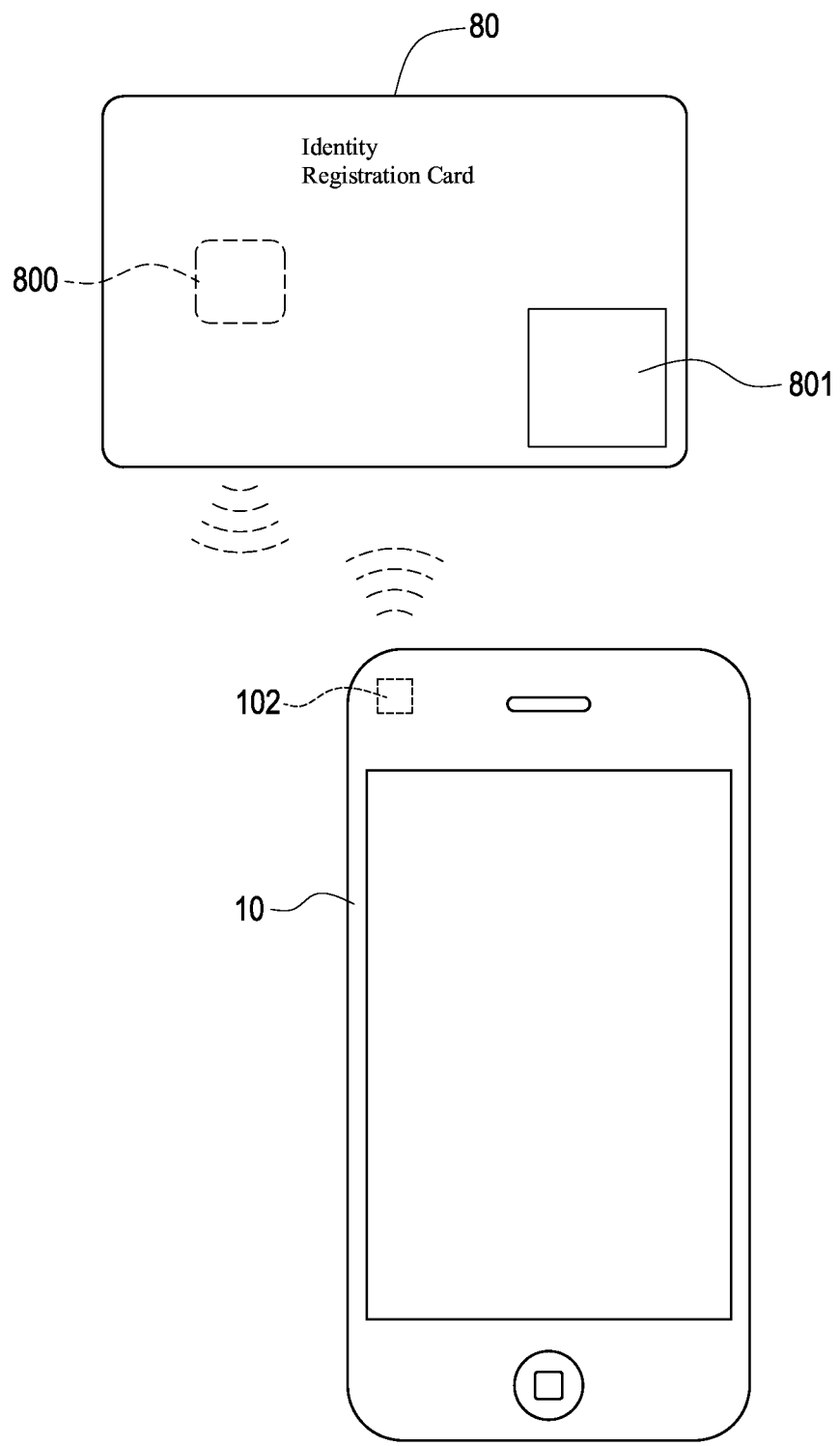
FIG. 10 is a schematic illustration of storage of identity data according to one embodiment of the present invention.
Figure 11:
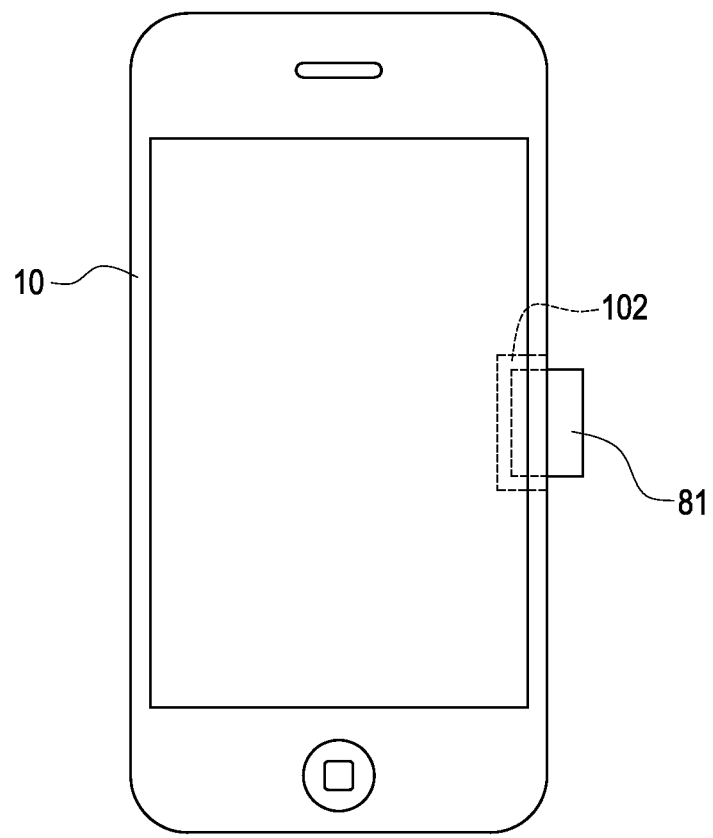
FIG. 11 is a schematic illustration of storage of identity data according to one embodiment of the present invention.
Figure 12:
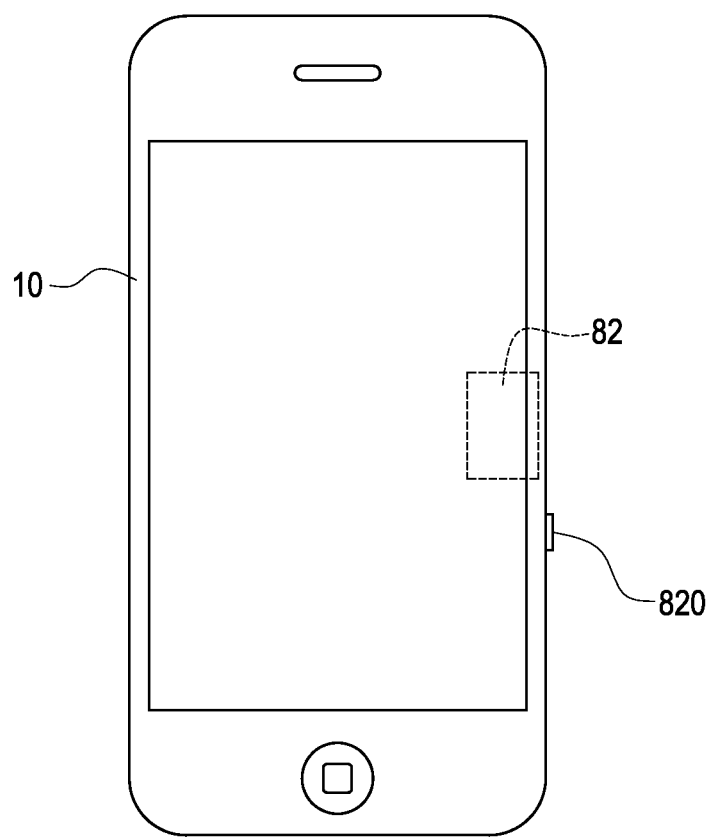
FIG. 12 is a schematic illustration of storage of identity data according to one embodiment of the present invention.

Please refer to FIG. 1, FIG. 2, FIG. 5, FIG. 10, FIG. 11 and FIG. 12. FIG. 5 is a partial flowchart of identity registration according to a fourth embodiment of the present invention. FIGS. 10 through 12 are schematic illustrations of storage of identity data according to embodiments of the present invention. As compared to the registration process shown in FIG. 2, Step S14 of the registration process of the present embodiment further comprises steps S40-S41, and Step S16 further comprises steps S42-S44.

Particularly, the user-end computer apparatus 10 executes the following steps after retrieving the analyzed identity data (in Step S12) and retrieving the embedded identity data (in Step S13).

In Step S40, the processing module 100 executes an encryption process on the variety of analyzed field data of the analyzed identity data so as to generate analyzed ciphertext data.

In one embodiment, the encryption process causes irreversible encryption, such as by means of hashing. The processing module 100 executes hashing on the analyzed identity data so as to obtain a hash value and uses it as analyzed ciphertext data.

Furthermore, the processing module 100 executes hashing processes on the variety of analyzed field data of the analyzed identity, respectively, so as to obtain a variety of hash values, and generates the analyzed ciphertext data according to the variety of hash values (such as by executing an additional hashing process on the variety of hash values).

In Step S41, the processing module 100 compares the analyzed ciphertext data with the embedded ciphertext data of the embedded identity data and determines whether they are matched with each other, so as to determine whether the analyzed identity data and the embedded identity data are matched with each other.

In one embodiment, the processing module 100 may retrieve a public key according to the embedded identity data (such as through the public key infrastructure (PKI)) and determine whether the public key is matched with the analyzed ciphertext data and the embedded ciphertext data, so as to validate the identity document 20.

If the processing module 100 determines that the data are matched, the user-end computer apparatus 10 configures the user's identity data according to the embedded identity data (or the analyzed identity data) (in Step S15). If the processing module 100 finds inconsistence, it executes Step S17 to show an error prompt.

In one embodiment, the processing module 100 may configure the field data of the user's identity data according to one or more of the embedded field data of the embedded identity data.

After configuration, the user-end computer apparatus 10 executes at least one of Steps S42-S44 to register the user's identity data.

In Step S42, the network access module 103 may be connected to a cloud server 31 or a block chain 33 through a network 30 and the processing module 100 may encrypt the user's identity data into ciphertext identity data, and upload the ciphertext identity data to the block chain 33 or the cloud server 31.

In Step S43, the processing module 100 encrypts the user's identity data into ciphertext identity data using the security module 107 of the user-end computer apparatus 10, and stores the ciphertext identity data in the storage module 106 of the user-end computer apparatus 10.

In particular, as shown in FIG. 1, the user-end computer apparatus 10 further comprises a security module 107 (such as Google's Titan M) electrically connected to the processing module 100. The security module 107 is separate and operates independently of the processing module 100.

In the present invention, the security module 107 is used to perform independent encryption on the sensitive data kept in the storage module 106 (e.g. the identity data), so as to generate encrypted data (such as ciphertext identity data), or to perform decryption on encrypted sensitive data and recover their unencrypted form. Since the processing module 100 is kept from the algorithm and key used to encrypt sensitive data, it cannot decrypt the encrypted data on its own, thereby further improving data security.

In one embodiment, the user-end computer apparatus 10 further comprises a secure input module 108 (such as a physical key or a sensor) electrically connected to the security module 107. The security module 107 only performs encryption or decryption on data after the secure input module 108 is triggered. Since the secure input module 108 is not connected to the processing module 100, the processing module 100 is unable to pretend the secure input module 108 to produce a fake trigger signal in a software-based manner to fool the security module 107 for encryption or decryption, thereby further improving data security.

For example, as shown in FIG. 12, the user-end computer apparatus 10 is provided with a security module 82 and a secure input module 820 that is a physical key herein. To encrypt or decrypt data (as shown in the screen of the display module 40 in FIG. 9), the user can directly press down the secure input module 820 to control the security module 82 to performs encryption or decryption, but not through the processing module 100.

In Step S44, the processing module 100 transmits the user's identity data to the computing unit 210 of the user's identity registration card 21 through the communication module 102 so as to encrypt and store the user's identity data in the computing unit 210.

Specifically, as shown in FIG. 1, the identity access control system 1 may comprise an identity registration card 21. The identity registration card 21 comprises a computing unit 210. The user-end computer apparatus 10 may store the retrieved user's identity data in the identity chip 210 of the identity registration card 21 through the communication module 102. By storing identity data in a separate identity registration card 21, the present invention eliminates the risk of unexpected disclosure of sensitive data when a user losses the user-end computer apparatus 10. Furthermore, the identity registration card 21 may include a communication interface electrically connected to the computing unit 210. The communication interface uses communication technology compatible with the communication module 102 and performs data communication with the communication module 102.

In one embodiment, identity registration card 21 may further comprise a certification input module 211 and an indication module 212 electrically connected to the computing unit 210. The certification input module 211 (such as a fingerprint recognition module, a keypad or another input module that generates different input signals) receives the user's certification input (in the form of, for example, a fingerprint or a password) for the computing unit 210 to check whether the input is correct (i.e. being matched with the pre-loaded fingerprint or password). If the computing unit 210 determines that the input is correct, the identity registration card 21 is permitted to receive and store the identity data from the user-end computer apparatus 10, or to read and transmit the user's identity data to the identity data.

For example, as shown in FIG. 10, the identity registration card 80 comprises an NFC interface. When the user wants to access the identity data, he/she may put the identity registration card 80 close to the communication module 102 of the user-end computer apparatus 10 so as to establish NFC connection.

Afterward, the user may input a password (such as a fingerprint or a string password) through the input module 801 of the identity registration card 80. Upon reception of a correct certification password, the computing unit 800 of the identity registration card 80 authorizes the user-end computer apparatus 10 to read (in the access control mode) or write (in the registration mode) the identity data.

In another instance, as shown in FIG. 11, the identity registration card 81 is a detachably connected communication module 102. When the user inserts the identity registration card 81 into the communication module 102, the identity data can be read or written as described above.

Thereby, the present invention provides alternatives for safe storage of identity data of users, thereby improving information security and preventing identity data from unexpected disclosure.

Figure 6:
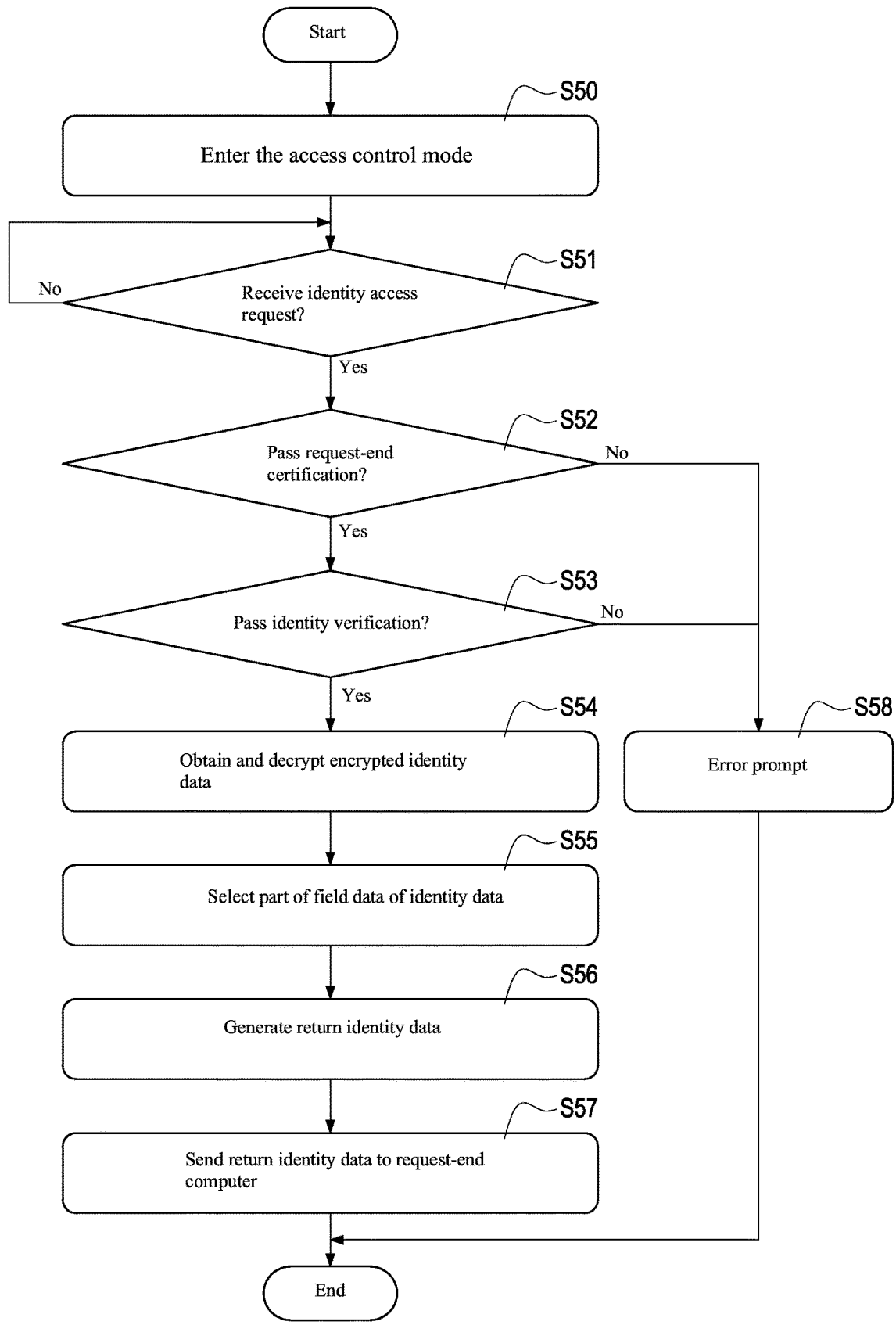
FIG. 6 is a flowchart of identity access control according to a fifth embodiment of the present invention.

Please refer to FIG. 1 and FIG. 6. FIG. 6 is a flowchart of identity access control according to a fifth embodiment of the present invention. The access control process of the present embodiment realizes fast certification through the following steps.

In Step S50, the processing module 100 of the user-end computer apparatus 10 enters the access control mode.

In Step S51, the processing module 100 determines whether it receives an identity-access request from a request-end computer apparatus 32.

In response to an identity-access request from a request-end computer apparatus 32 it receives, the processing module 100 executes Step S52. Otherwise, the processing module 100 executes Step S51 again.

In Step S52, the processing module 100 analyzes the identity-access request to extract the digital signature of the request end from the identity-access request, and performs request-end certification on the request end's digital signature to determine whether the request end's digital signature is legitimate or valid.

If the processing module 100 determines that the request end digital signature of the identity-access request passes certification, it executes Step S53. Otherwise, the processing module 100 executes step S58.

In Step S53, the processing module 100 performs identity verification on the current user.

If the processing module 100 determines that the current user passes identity verification, it executes Step S54. Otherwise, the processing module 100 executes step S58.

In Step S54, the processing module 100 retrieves the ciphertext identity data relevant to the user, and decrypts the ciphertext identity data so as to obtain the identity data as plaintext.

In one embodiment, as shown in FIG. 1, the processing module 100 retrieves ciphertext identity data relevant to the user from a block chain 33 or a cloud server 31, and uses a decryption key to decrypt the ciphertext identity data, so as to obtain the identity data as plaintext.

In one embodiment, as shown in FIGS. 1 and 12, the processing module 100 reads ciphertext identity data relevant to the user from the storage module 106 of the user-end computer apparatus 10, and (when the secure input module 108 (or the secure input module 820) is triggered) decrypts the ciphertext identity data through the security module 107 of the user-end computer apparatus 10 (or security module 82) for obtaining the identity data as plaintext.

In one embodiment, as shown in FIGS. 1, 10, and 11, the processing module 100 is connected to an identity registration card 21 (or an identity registration card 80, 81) through the communication module 102. The computing unit 210 of the identity registration card 21 (or the computing unit 800 of the identity registration card 80) when determining that the current user passes identity verification, decrypts the stored ciphertext identity data so as to obtain the identity data as plaintext, and transmits it to the user-end computer apparatus 10 through the communication module 102.

In Step S55, the processing module 100 selects a part of the field data of the user's identity data according to the identity-access request.

In Step S56, the processing module 100 generates return identity data according to the selected part of the field data.

In Step S57, the processing module 100 returns the generated return identity data to the request-end computer apparatus 32.

In one embodiment, the selected part of the field data is recorded in the return identity data as plaintext or in a reversibly encrypted manner.

If the processing module 100 determines that the digital signature of the request end fails to pass certification or the user fails to pass identity verification, it executes Step S58. The processing module 100 shows an error prompt through the man-machine interface 105 to indicate failure of request-end certification or identity verification.

Thereby, the present invention can ensure veracity of the request end, and can reduce the risk of unauthorized use of users' identity data.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A method of registration and access control of identity for third-party certification, comprising steps of:
   a) in a registration mode, controlling a user-end computer apparatus to retrieve an identity image of an identity document of a user, wherein the identity image is obtained by photographing an identity data page in the identity document using an image-capturing module;
   b) executing an optical character recognition process and an identity analysis process so as to obtain analyzed identity data;
   c) retrieving embedded identity data from the identity document using a communication module of the user-end computer apparatus;
   d) if the analyzed identity data and the embedded identity data are at least partially matched with each other, according to at least one of the analyzed identity data and the embedded identity data, configuring and registering the identity data of the user;
   e) in an access control mode, controlling the user-end computer apparatus to execute identity verification for the user upon reception of an identity-access request from a request-end computer apparatus;

f) when the user passes the identity verification, according to the identity data of the user and the identity-access request, generating and returning return identity data to the request-end computer apparatus, wherein the analyzed identity data includes a variety of analyzed field data; and the step d) comprises steps of:

d1) executing an encryption process of the field data of the analyzed identity data so as to generate analyzed ciphertext data; and d2) when the analyzed ciphertext data and the embedded ciphertext data of the embedded identity data are determined matched with each other, determining that the analyzed identity data and the embedded identity data are matched with each other; and performing identity registration according to a user's identity data by one of:

encrypting the user's identity data into ciphertext identity data, and uploading the ciphertext identity data to a block chain or a cloud server;

encrypting the user's identity data into ciphertext identity data using a security module of the user-end computer apparatus, and storing the ciphertext identity data in the storage module of the user-end computer apparatus; or transmitting the user's identity data to a computing unit of a user's identity registration card through the communication module so as to encrypt and store the user's identity data in the computing unit.

2. The method of claim 1, wherein the communication module is an NFC module or a Bluetooth module, the step c) includes when the communication module senses a computing unit of the identity document, receiving the embedded identity data from the computing unit.

3. The method of claim 1, wherein the communication module is a smartcard reading/writing module, and the step c) includes when the communication module contacts a computing unit of the identity document, receiving the embedded identity data from the computing unit.

4. The method of claim 1, wherein the embedded identity data includes a variety of embedded field data, and the step d) further comprises steps of:

d3) according to the embedded field data, configuring the field data of the identity data of the user; and d4) registering the identity data of the user.

5. The method of claim 4, wherein the step d4) includes encrypting the identity data of the user into ciphertext identity data, and uploading the ciphertext identity data to a block chain or a cloud server.

6. The method of claim 4, wherein the step d4) includes encrypting the identity data of the user into the ciphertext identity data using a security module of the user-end computer apparatus, and storing the ciphertext identity data in the user-end computer apparatus.

7. The method of claim 4, wherein the step d4) includes transmitting the identity data of the user to a computing unit of an identity registration card of the user using the communication module so as to store the identity data of the user in the computing unit of the identity registration card in an encrypted form.

8. The method of claim 7, wherein the identity verification is biometric certification, face certification, password certification, operational qualification or security questions certification.

9. The method of claim 7, wherein the step f) comprises steps of:

f1) when the user passes the identity verification, retrieving ciphertext identity data relevant to the user, and decrypting the ciphertext identity data so as to obtain the identity data as plaintext;

f2) according to the identity-access request, selecting a part of field data of the identity data of the user; and f3) according to the selected part of the field data, generating the return identity data, and returning the return identity data to the request-end computer apparatus, wherein the selected part of the field data is recorded in the return identity data as plaintext or in a reversibly encrypted manner.

10. The method of claim 9, wherein the step f1) includes retrieving the ciphertext identity data relevant to the user from a block chain or a cloud server, and decrypting the ciphertext identity data using a decryption key so as to obtain the identity data as plaintext.

11. The method of claim 9, wherein the step f1) includes reading the ciphertext identity data relevant to the user from the user-end computer apparatus, and decrypting the ciphertext identity data using a security module of the user-end computer apparatus so as to obtain the identity data as plaintext.

12. The method of claim 9, wherein the step f1) includes when a computing unit of an identity registration card determines that the user passes the identity verification, decrypting the stored ciphertext identity data so as to obtain the identity data as plaintext, and transmitting the identity data as plaintext to the user-end computer apparatus using the communication module.

13. The method of claim 7, further comprising a step g) prior to the step d), in which the step g) includes, in the registration mode, photographing the user using the image-capturing module at the user-end computer apparatus so as to obtain a face image of the user; and the step d) includes when the analyzed identity data and the embedded identity data are matched each other and the face image of the user and an embedded face image of the embedded identity data are matched with each other, configuring and registering the identity data of the user.

14. The method of claim 7, further comprising a step h) prior to the step d), in which the step h) includes, in the registration mode, capturing a user biometric of the user using a biometric-capturing module at the user-end computer apparatus; and the step d) includes when the analyzed identity data and the embedded identity data are matched each other and the user biometric and an embedded biometric of the embedded identity data are matched with each other, configuring and registering the identity data of the user.

15. The method of claim 7, further comprising a step i) prior to the step f), in which the step i) includes, in the access control mode, when the user-end computer apparatus receives the identity-access request from the request-end computer apparatus, executing request-end certification on a request end digital signature of the identity-access request; and the step f) includes when the user passes the identity verification and the identity-access request passes the request-end certification, generating the return identity data, and returning the return identity data to the request-end computer apparatus.

* * * * *